US009900448B2

(12) United States Patent
Wang et al.

(10) Patent No.: US 9,900,448 B2
(45) Date of Patent: Feb. 20, 2018

(54) TECHNOLOGIES FOR DISPLAYING IMAGES DURING A PRE-BOOT PHASE OF A VEHICLE COMPUTING PLATFORM

(75) Inventors: Qi Wang, Shanghai (CN); Jian Javen Wang, Shanghai (CN); Yaohui Shang, Shanghai (CN); Michael A. Rothman, Puyallup, WA (US); Vincent Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 13/976,612

(22) PCT Filed: Dec. 6, 2011

(86) PCT No.: PCT/CN2011/083522
§ 371 (c)(1),
(2), (4) Date: Aug. 5, 2014

(87) PCT Pub. No.: WO2013/082752
PCT Pub. Date: Jun. 13, 2013

(65) Prior Publication Data
US 2014/0368653 A1   Dec. 18, 2014

(51) Int. Cl.
G06F 13/24        (2006.01)
H04N 1/00         (2006.01)
(Continued)

(52) U.S. Cl.
CPC ......... *H04N 1/00209* (2013.01); *B60R 1/002* (2013.01); *B60R 11/04* (2013.01); *B60W 30/18036* (2013.01); *B60W 50/06* (2013.01); *G06F 13/24* (2013.01); *H04N 1/00095* (2013.01); *B60R 2300/802* (2013.01); *B60W 2420/42* (2013.01); *H04N 2101/00* (2013.01)

(58) Field of Classification Search
None
See application file for complete search history.

(56) References Cited

U.S. PATENT DOCUMENTS 5,915,265 A * 6/1999 Crocker .............. G06F 12/0223
                                                  711/170
2004/0123090 A1    6/2004 Zimmer et al.
(Continued)

FOREIGN PATENT DOCUMENTS

CN    1567245 A     1/2005
CN    101206606 A   6/2008
(Continued)

OTHER PUBLICATIONS

Search Report of R.O.C. Patent Application No. 101125075, dated Mar. 24, 2016, 2 pages.
(Continued)

*Primary Examiner* — Kim Huynh
*Assistant Examiner* — Danny Chan
(74) *Attorney, Agent, or Firm* — Barnes & Thornburg LLP

(57) ABSTRACT

A method and system for improving responsiveness of a vehicle computing platform includes enabling a camera feature during the pre-boot phase of a computing device and using a special-purpose operating mode of the computing device to initiate the streaming of camera image data to a display.

18 Claims, 4 Drawing Sheets

(51) Int. Cl.
*B60R 1/00* (2006.01)
*B60R 11/04* (2006.01)
*B60W 50/06* (2006.01)
*B60W 30/18* (2012.01)
*H04N 101/00* (2006.01)

(56) References Cited

U.S. PATENT DOCUMENTS

| | | | |
|---|---|---|---|
| 2005/0128061 A1* | 6/2005 | Yanai | B60R 1/00 340/435 |
| 2007/0173983 A1* | 7/2007 | Takahashi | B60R 1/00 701/1 |
| 2008/0165251 A1* | 7/2008 | O'Kere | B60R 25/00 348/148 |
| 2010/0079472 A1 | 4/2010 | Shang et al. | |
| 2012/0105635 A1* | 5/2012 | Erhardt | B60R 25/102 348/148 |
| 2013/0002877 A1* | 1/2013 | Miyoshi | B60R 1/00 348/148 |

FOREIGN PATENT DOCUMENTS

| | | |
|---|---|---|
| CN | 101714091 A | 5/2010 |
| CN | 101894499 A | 11/2010 |
| WO | 2013082752 A1 | 6/2013 |

OTHER PUBLICATIONS

Intel Corporation, "Low Power Intel® In-Vehicle Infotainment Reference Design," User Manual, Revision 003, Mar. 2010, 108 pages.
International Search Report and Written Opinion received for International Patent Application No. PCT/CN2011/083522, dated Sep. 20, 2012, 13 pages.

* cited by examiner

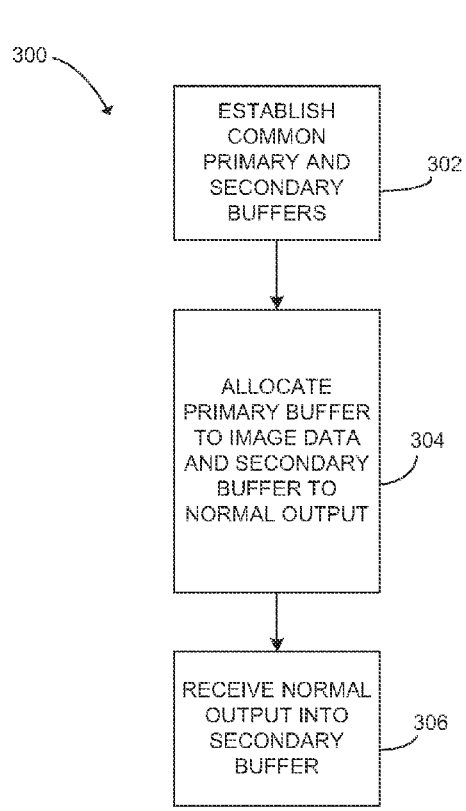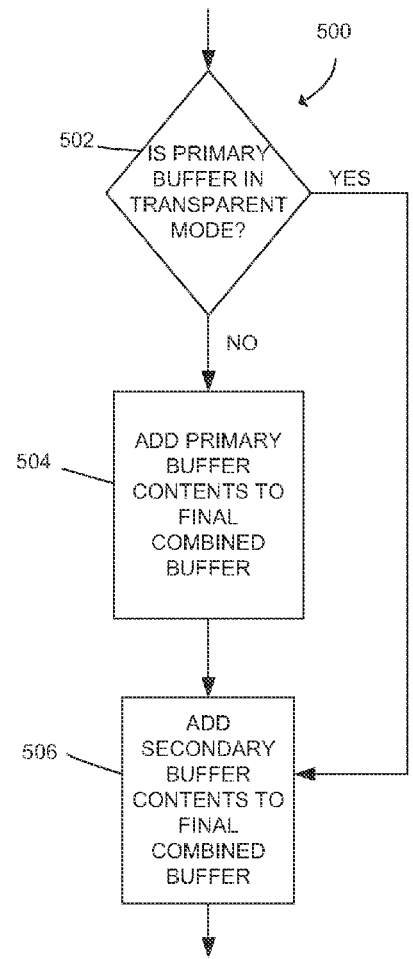
FIG. 3
FIG. 5

TECHNOLOGIES FOR DISPLAYING IMAGES DURING A PRE-BOOT PHASE OF A VEHICLE COMPUTING PLATFORM

BACKGROUND

A vehicle computing platform can enable a number of features that enhance the driving experience and/or provide assistance to the driver. A rearview camera is one such feature. Images captured by the rearview camera can be displayed within the sight range of the driver of the vehicle, to assist the driver in avoiding obstacles when driving in reverse, for example. Vehicles are often driven in reverse to exit a parking space. Therefore, it is common for drivers to shift into the reverse gear shortly after starting the vehicle.

Many computing platforms use a special-purpose operating mode to handle system-wide functions, such as, for example, power management, hardware control, and/or error handling. In some computing environments, the special-purpose operating mode is known as the System Management Mode (SMM), and that term may be used herein to refer to such special-purpose operating modes more generally.

The SMM is a platform service that s typically hidden from any operating system being executed by the processor of the computing platform. Use of the system management mode may be initiated by the generation of a management interrupt event such as a system management interrupt (SMI) or a platform management interrupt (PMI) depending upon the particular processor architecture. These interrupt events are usually non-maskable and thus take precedence over maskable interrupts and other events. Typically, the management interrupt initiates an asynchronous process that runs concurrently with any operating system processes that may be executing.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 is a simplified flow diagram of at least one embodiment of a method for allocating memory for storing image data;

FIG. 5 is a simplified flow diagram of at least one embodiment of a method for displaying image data.

DETAILED DESCRIPTION OF THE DRAWINGS

Figure 1:
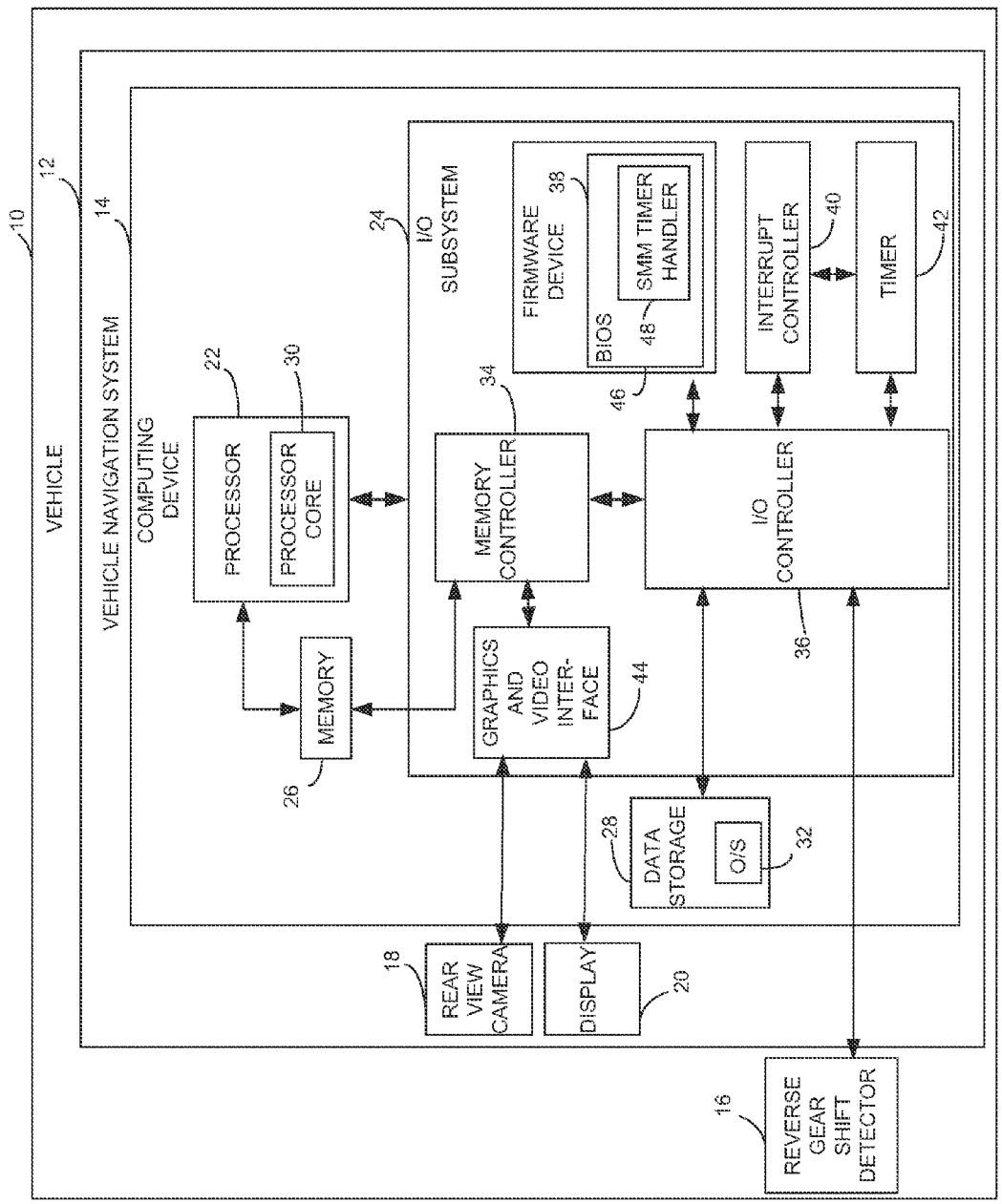
FIG. 1 is a simplified block diagram of at least one embodiment of a computing platform for a vehicle navigation system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, an illustrative vehicle 10 includes a vehicle navigation system 12, which may be integrated into the vehicle 10 (e.g., installed in the vehicle dashboard) or may be embodied as a vehicle accessory removable from the vehicle 10. The illustrative vehicle navigation system 12 includes a computing device 14, a rearview camera 18, and a display A. In use, the computing device 14 is configured to control the display 20 to display images received from the rearview camera 18 to provide visual guidance to the driver while in a reverse gear (e.g., when the vehicle 10 is backing-up). In particular, as discussed in more detail below, the computing device 14 is configured to promptly activate the features of the rearview camera 18 so that images received from the rearview camera 18 may be displayed on the display 20 shortly after the vehicle 10 is turned on.

The vehicle 10 may be embodied as any type of powered vehicle that includes at least one forward gear, at least one reverse gear, and a mechanism that enables the driver to shift from a forward gear to a reverse gear (e.g., a transmission with a gearshift selector). The illustrative vehicle 10 includes a reverse gearshift detector 16, which may be embodied as any device or mechanism by which a shift into a reverse gear can be detected. For example, the reverse gearshift detector 16 may be embodied as a sensor located on the transmission or on the gearshift selector of the vehicle 10. In any event, the reverse gearshift detector 16 provides an indication (e.g. by voltage output or a lack of voltage output, for example) in response to the occurrence of a reverse gearshift event.

As discussed above, the vehicle navigation system 12 may be integrated with the vehicle 10 (e.g., installed in the vehicle dashboard), or may be embodied as an after-market product that plugs into a power receptacle located in the vehicle cabin. In some embodiments, the vehicle navigation system 12 forms part of a larger "in-vehicle infotainment" system. Which may provide a number of digital applications that can be used by occupants of a vehicle, for example, rear-seat entertainment, music, location-based services, and external connectivity features such as access to the Internet and/or roadside assistance services.

The rearview camera 18 may be embodied as a compact digital video camera that can be placed in a suitable location on or in the vehicle 10 to capture video image data of portions of the rear end of the vehicle 10 and surrounding areas. In some embodiments, the rearview camera 18 is incorporated into the vehicle 10 such as within a rear taillight, within a rear bumper, or the like. In some embodiments, the display 20 may include a compact digital video display, such as a small (e.g. 7 inch) touchscreen display or the like. In some embodiments, the display 20 may be embodied as a multipurpose display used to, for example, display a Global Positioning System (GPS) application or other application(s), alternatively or in addition to video image data received from the rearview camera 18. The display 20 is typically located in the vehicle cabin within the field of view of the driver.

The computing device 14 includes at least one processor 22, an input/output (I/O) subsystem 24, and at least one data storage device 28. In the vehicle computing platform context of the illustrative embodiment, the computing device 14 is typically embodied as an embedded system that is installed in the vehicle 10. However, the computing device 14 may be embodied as any type of computing device having a camera associated therewith such as, for example, a desktop computer system, a laptop or tablet computer system, a server, an enterprise computer system, a network of computers, a handheld computing device, or other electronic device depending on the particular application.

The processor 22 includes at least one processor core 30. In addition to an amount of cache memory, the processor 22 includes, or is otherwise communicatively coupled to, a memory 26. The memory 26 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The processor 22 is also communicatively coupled to the I/O subsystem 24. The illustrative I/0 subsystem 24 includes a memory controller (e.g., a memory controller hub (MCH) or northbridge) 34, an input/output controller (e.g., an input/output controller hub (ICH) or southbridge) 36, and a firmware device 38. Of course, in other embodiments, I/O subsystems having other configurations may be used. For example, in some embodiments, the I/O subsystem 24 may form a portion of a system-on-a-chip (SoC) and be incorporated, along with the processor 104 and other components of the computing device 14, on a single integrated circuit chip. As such, although components of the I/O subsystem 24 are illustrated in FIG. 1 as individual components, it will be appreciated that each component of the I/O subsystem 24 may be located on a common integrated circuit chip in some embodiments.

The memory controller 34 is communicatively coupled to the memory 26 and a graphics and video interface 44. The graphics and video interface 44 is communicatively coupled to the rearview camera 18 and the display 20. The graphics and video interface 44 includes, for example, a low-voltage differential signaling (LVDS) or video graphics array (VGA) interface.

The memory controller 34 is also communicatively coupled to the I/O controller 36, and the I/O controller 36 is communicatively coupled to the firmware device 38. The firmware device 38 is typically embodied as a non-volatile memory or read-only memory (ROM) device such as flash memory. In the illustrative embodiment, the firmware device 38 stores the set of routines commonly known as the Basic Input/Output System (BIOS) 46, which includes special-purpose operating mode (e.g., SMM) data and/or instructions, such as an SMM timer handler 48, and/or other information.

Typically, the BIOS 46 enables the computing device 14 to start the operating system and to communicate with the various devices in the vehicle navigation system 12. Depending upon the particular processor architecture, a Unified Extensible Firmware Interface (UEFI) or other instructions may be used in place of the BIOS; however, for ease of description the term BIOS may be used herein to refer more generally to the BIOS, the UEFI, or any similar such mechanism. During operation, portions of the BIOS 46 and/or SMM timer handler 48 may be copied to the memory 26, for faster execution or other reasons.

The I/O subsystem 24 also includes an interrupt controller 40 and a timer 42. While shown separately for ease of illustration, each or either of the interrupt controller 40 and/or timer 42 may be embodied in the I/O controller 36, the firmware 38, and/or the processor 22, for example. The interrupt controller 40 generates management interrupts (such as SMIs or PMIs) in response to the occurrence of events. The timer 42 can be enabled to count down a determined or programmable period of time (e.g. 0.9 ms-2.1 ms, 12 ms, 28-36 ms, or 60-68 ms), such that expiration of the period of time initiates a management interrupt.

The I/O controller 36 is also communicatively coupled to the data storage 28. In the illustrative embodiment, an operating system (O/S) 32 resides in the data storage 28. The operating system 32 is, for example, a Microsoft Windows®, Linux, or other operating system, or other similar set of instructions, which may be designed specifically for discrete, handheld, or portable electronic devices in some embodiments. Portions of the O/S 32 may be copied to the memory 26 during operation, for faster processing or other reasons.

The I/O controller 36 may be communicatively coupled to one or more other peripheral devices such as a network interface (not shown), depending upon, for example, the intended use of the computing device 14. Further, it should be appreciated that the computing device 14 may include other components, sub-components, and devices not illustrated in FIG. 1 for clarity of the description.

In general, the components of the vehicle 10, vehicle navigation system 12, and computing device 14 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

Figure 2:
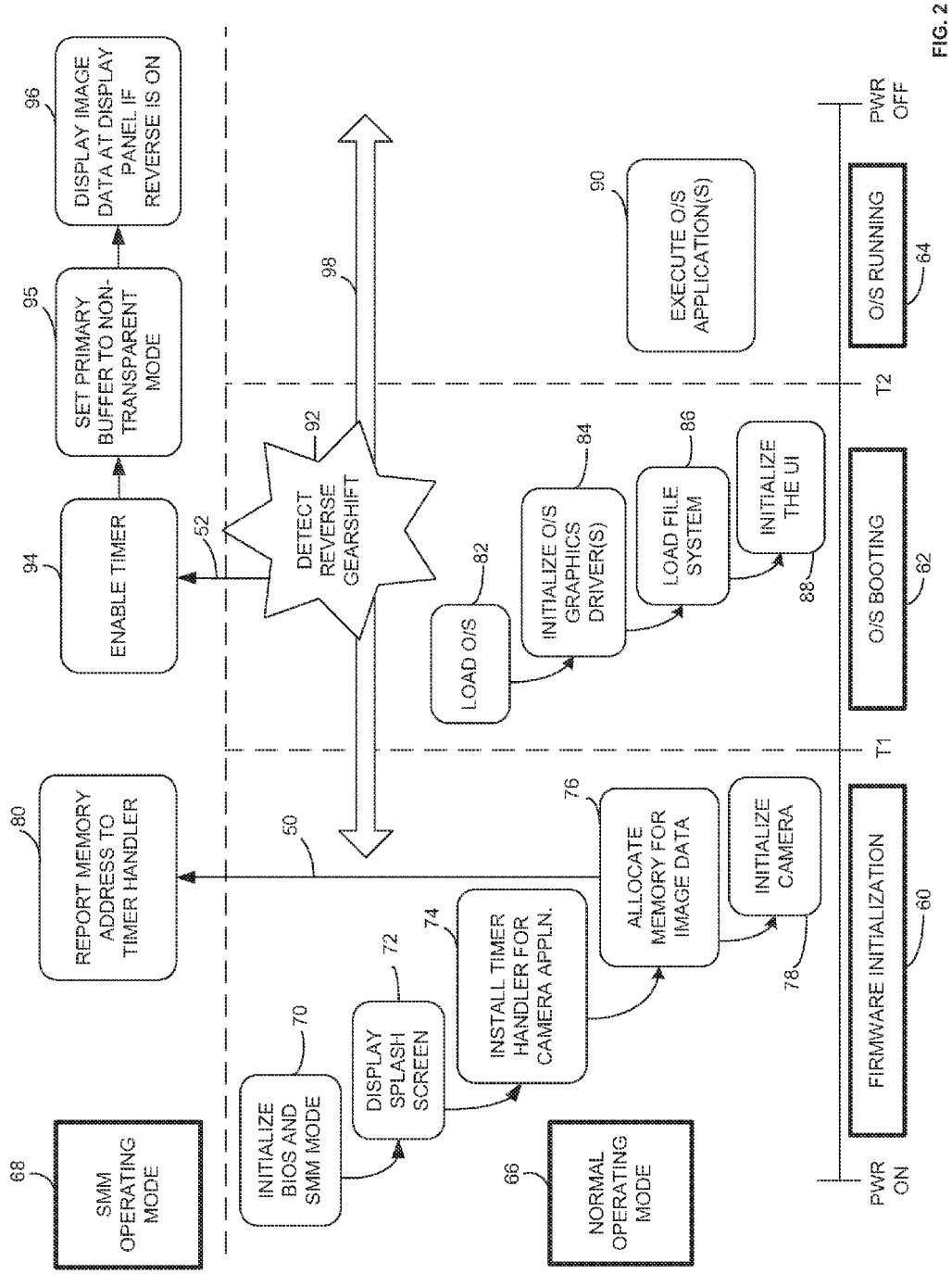
FIG. 2 is a simplified timing diagram of at least one embodiment of phases of operation and operating modes of the computing device of FIG. 1.

In operation, power to the vehicle navigation system 12 is typically supplied at the same time as the vehicle 10 is turned on; however, this need not be the case. For example, in some embodiments, a driver of the vehicle may turn the vehicle navigation system 12 on or off after starting the vehicle 10. Referring to FIG. 2, a timing diagram illustrates phases of operation of the computing device 14 that occur after the vehicle navigation system 12 is turned on. As the computing device 14 is capable of operating in a normal operating mode 66 and a special-purpose operating mode 68, FIG. 2 also illustrates instructions, routines, processes, or the like that occur in each of those modes.

The phases of operation of the computing device 14 include a firmware initialization or "BIOS" phase 60, an operating system booting phase 62, and an operating system running phase 64. The firmware initialization phase 60 and the O/S booting phase 62 may be referred to more generally as the "pre-boot" phase, while the O/S running phase 64 may be referred to as the "runtime" phase. The phases 60, 62, 64 generally occur one after the other; for example, the O/S booting phase 62 typically does not begin until the firmware initialization phase 60 is complete. Likewise, the O/S running phase 64 typically does not start until the OS booting phase 62 is complete. The operating modes 66, 68 may run concurrently.

During the firmware initialization phase 60, the computing device 14 executes instructions, routines, processes or the like to accomplish the tasks identified by blocks 70, 72, 74, 76, and 78. These tasks are accomplished in the normal operating mode 66. At block 70, the BIOS 46 is initialized. At block 72, a splash screen, which may include a vehicle or software product logo, for example, is displayed at the display 20.

Figure 4:
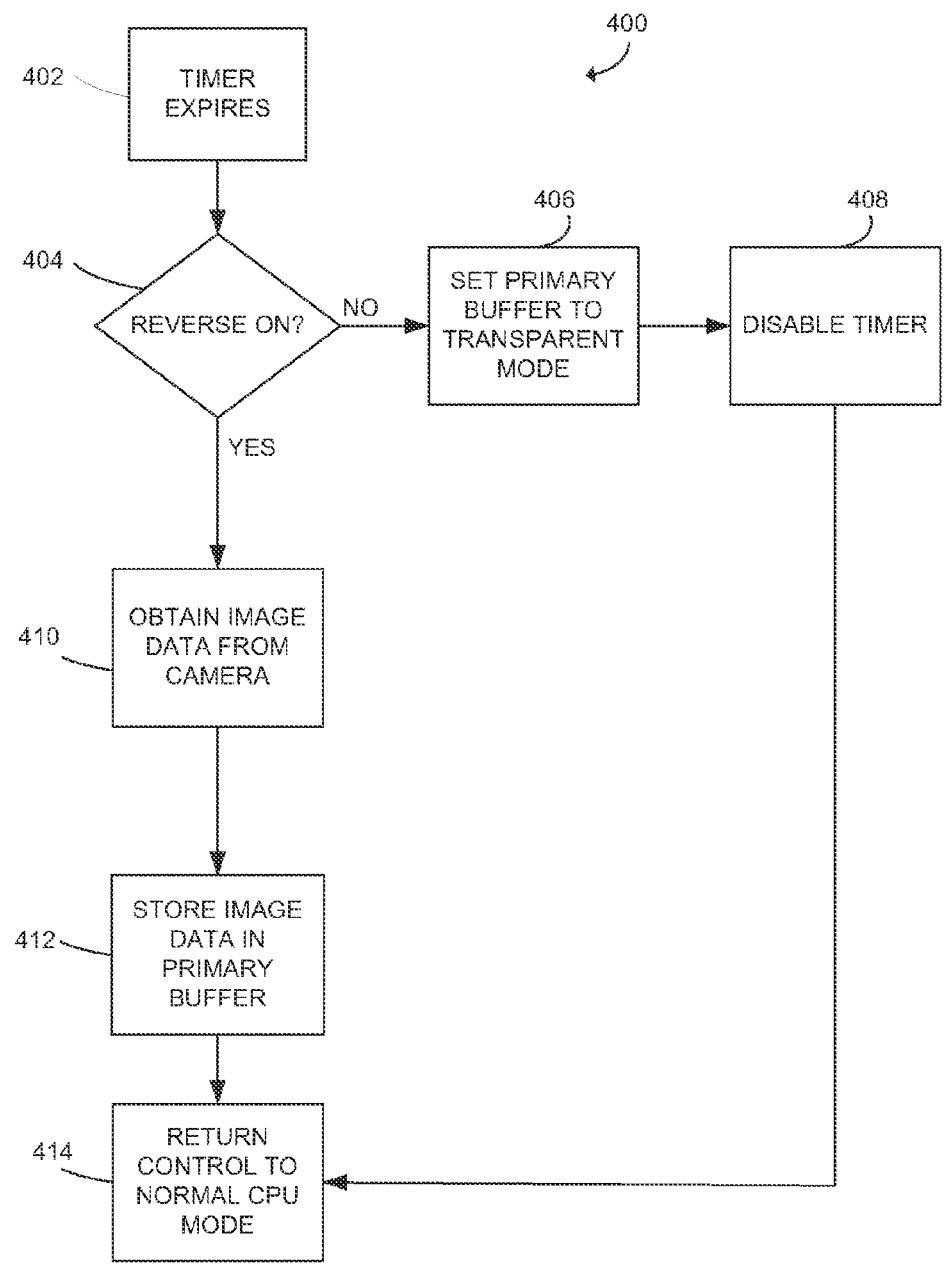
FIG. 4 is a simplified flow diagram of at least one embodiment of a method for obtaining image data.

The tasks represented by blocks 74, 76, 78, and 80 configure the computing device 14 for the real-time streaming of image data from the rearview camera 18 to the display 20. At block 74, the SMM timer handler 48, which is configured to stream image data from the rearview camera 18 into memory of the computing device 14, is installed. The timer handler 48 includes instructions, routines, or the like, which run in the SMM operating mode 68 and enable the acquisition of image data from the camera 18. An illustrative method that may be embodied in the timer handler 48 is shown in FIG. 4 and described below.

At block 76, memory is allocated for the storage of image data from the camera 18. An illustrative method for accomplishing the tasks of block 76 is shown in FIG. 3, which is described below. The address of the allocated memory is reported to the timer handler 48 at block 80 using a management interrupt 50. The management interrupt 50 is, in the illustrative embodiment, a non-maskable interrupt that initiates an asynchronous process in the SMM mode 68. At block 78, the camera 18 is initialized. The tasks identified by blocks 70, 72, 74, 76, and 78 occur prior to the time T1, which marks the end of the firmware initialization phase 60.

Blocks 82, 84, 86, and 88 illustrate typical activities that occur during the O/S booting phase 62. At block 82, the operating system 32 is loaded. The operating system graphics driver(s) are initialized at block 84. At block 86, the file system for the operating system 32 is loaded into the memory 26. A user interface for the operating system 32 is initialized at block 88. The tasks identified by blocks 82, 84, 86, 88 occur prior to the time 12, which marks the end of the O/S booting phase 62 and indeed, the end of the pre-boot phase. After the time 12, the computing device 14 operates in the O/S running phase 64, in which the computing device 14 is typically available for interaction with a user. During this phase, one or more operating system applications 90 may be executed until the vehicle navigation system 12 is powered off.

It will be appreciated that the time to complete the firmware initialization phase 60 in many computing devices is typically in the range of about 2 seconds (T1), and that the time to complete the O/S booting phase 62 is typically in the range of about 4 to 8 seconds (T2). As a result, the total elapsed time for completing the pre-boot phase, e.g. from power on to the beginning of the O/S running phase 64, can be in the range of about 6 to 10 seconds. As shown in FIG. 2, blocks 74, 76, 78, and 80 configure the computing device 14 to receive image data from the rearview camera 18 prior to the end of the firmware initialization phase 60 and thus, prior to the end of the pre-boot phase.

Referring to blocks 92, 94, 95, and 96 of FIG. 2, the vehicle navigation system 12 enables streaming of image data from the rearview camera 18 to the display 20 upon detecting that the vehicle 10 has been shifted into a reverse gear. At block 92, the navigation system 12 detects a reverse gearshift event by, for example, monitoring an I/O port of the I/O controller 36 for a signal from the reverse gearshift detector 16. As indicated by the double-headed arrow 98, blocks 92, 94, 96 can occur during either the pre-boot phase or the runtime phase of the computing device 14. More specifically, once the tasks identified by blocks 74, 76, 78 and 80 have been completed, blocks 92, 94, 95, and 96 may occur during any of the three operating phases 60, 62, 64 of the computing device 14. As explained below, the streaming of data from the camera 18 to the display panel 20 is performed by the time handler 48 within a small amount of time, so that the normal CPU operations such as system initialization, O/S booting and the executions of user applications are not aware of any interruption.

If a reverse gearshift event is detected at block 92, then at block 94 control is transferred to the SMM operating mode 68, in which the timer handler 48 (FIG. 4) is executed to stream the real-time video image data from the camera 18 to the memory allocated at block 76. This transfer of control is initiated by a non-maskable interrupt. (such as an SMI or PMI), represented by the arrow 52.

At block 94, a timer 42 is enabled, and, if the timer 42 expires, a method 400, illustratively shown in FIG. 4 and described below, is initiated. At block 95, a primary buffer of a common buffer is set to a non-transparent mode. At block 96, a method 500, illustratively shown in FIG. 5, is initiated to display the image data in real time at the display 20, periodically, if the vehicle 10 is in a reverse gear. After streaming the real-time video images to memory, the SMM timer handler 48 returns control to activities (such system initialization, O/S booting, user applications, and the like) that are typically executed in normal CPU mode.

Referring now to FIG. 3, an illustrative method 300 for accomplishing the task of block 76 of FIG. 2, which is to allocate memory for the image data to be received from the camera 18, is shown. At block 302, the computing device 14 establishes a common buffer including a primary buffer and a secondary buffer. To do this, the BIOS 46 allocates a memory array from memory 26 or other memory available to the I/O subsystem 24. The BIOS 46 also makes the common buffer subject to an override policy in which the primary buffer is assigned a higher priority than the secondary buffer.

At block 304, the computing device 14 assigns the primary buffer to the image data from the camera 18, while the secondary buffer is assigned to the normal output of the BIOS 46 and the O/S 32. During the pre-boot phases 60, 62, the normal output is typically the splash screen displayed at block 72. During the O/S running phase 64, the normal output may include a graphical user interface or other output of the O/S or any application(s) that may be running.

The common buffer is configured to be usable by the graphics and video interface 44 irrespective of the phase of operation of the computing device 14. That is, depending on the phase of operation 60, 62, 64, a different graphics driver may be involved in handling the camera image data. For example, during the firmware initialization phase 60, a Graphic Output Protocol (GOP) driver may handle the camera image data, while during the O/S booting phase 62 a standard (e.g. VGA compatible) frame buffer driver may handle the image data and during the O/S running phase 64, a full-featured graphic driver, such as a Direct Rendering Manager (DRM) graphic driver, may handle the camera image data. At block 306, the normal system output is received into the secondary buffer and displayed at the display 20 by the appropriate graphics driver for the phase of operation. The process of block 306 typically continues until a reverse gearshift event occurs or another event interrupts the normal operation of the computing device 14.

Referring now to FIG. 4, the illustrative method 400. Which is configured to stream the camera image data to memory if a reverse gearshift event has occurred, is shown. If the computing device 14 detects a reverse gearshift event, e.g. as described above, the timer 42 is enabled at block 94 (see FIG. 2) according to the specified timeout interval. As such, at block 402, if the timeout interval has expired, a management interrupt is generated to cause the processor 22 to enter SMM operating mode 68 and execute the timer handler 48 that was installed at block 74 (see FIG. 2). The management interrupt is typically a non-maskable interrupt that takes priority over other events.

At block 404, a check is performed to determine whether the vehicle 10 is in a reverse gear, e.g. by monitoring an I/O port as described above. If the vehicle 10 is not in a reverse gear, then the primary buffer is set to a transparent mode at block 406, and the timer 42 is disabled at block 408. If the vehicle 10 is in a reverse gear, then the image data is obtained from the camera. 18 via the graphics and video interface 44 at block 410, and stored in the primary buffer at block 412. Blocks 406, 408, 410, and 412 illustrate tasks typically performed by the timer handler 48 in the SMM operating mode 68. At block 414, control is returned to the normal CPU operating mode 66.

Referring now to FIG. 5, the illustrative method 500 for accomplishing the task of block 96 of FIG. 2, which is to display the camera image data at the display 20, is shown. At block 502, the graphics and video interface 44 checks to see if the primary buffer for the camera data is in transparent mode. If the primary buffer is not in transparent mode, the contents of the primary buffer are added to a final combined buffer of the common buffer, at block 504. If the primary buffer is in transparent mode, the contents of the primary buffer are ignored.

At block 506, the contents of the secondary buffer (e.g., the normal screen output) are added to the final combined buffer of the common buffer. Thus, if the vehicle 10 is in a reverse gear, the final combined buffer can include the contents of the primary buffer and the secondary buffer. However, if the vehicle 10 is not in a reverse gear, then the final combined buffer may include only the contents of the secondary buffer.

Depending on the dimensions of the camera image output, the camera image data may overlay all or a portion of the total screen area of the display 20. In other words, it may be possible for both camera output and normal output to be displayed at the display 20 at the same time. Also, it will be appreciated that if a reverse gearshift occurs while the computing device 14 is in the O/S running phase 64, the rearview camera output will be displayed at the display 20, overriding the normal screen output (at least as to the dimensions of the camera image), which may include overriding the output of an O/S application.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure have been described in the context of a vehicle computing platform, it will be understood that the various aspects have other applications, for example, any application in which it is desired to cause a processor to give priority to a process that runs concurrently with the normal operating mode of the computing device. Such applications may include, for example, consumer electronics and home appliance applications.

The invention claimed is:

1. At least one non-transitory computer accessible medium comprising a plurality of instructions that in response to being executed, cause a computing device to:
    allocate, during a pre-boot phase of the computing device, a primary buffer of a memory of the computing device for storage of streamed image data from a camera of the computing device;
    allocate, during the pre-boot phase of the computing device, a secondary buffer of the memory for storage of image data, other than the streamed image data, produced by the computing device during the pre-boot phase;
    store, during the pre-boot phase of the computing device, the image data produced by the computing device during the pre-boot phase in the secondary buffer;
    initiate, during the pre-boot phase of the computing device, the streaming of image data from the camera to the primary buffer;
    issue a management interrupt to report the location of the allocated memory to a timer handler.

2. The at least one non-transitory computer accessible medium of claim 1, wherein to initiate the streaming of the image data comprises to initiate the streaming of the image data from the camera to the primary buffer during a firmware initialization phase of the computing device.

3. The at least one non-transitory computer accessible medium of claim 2, wherein the plurality of instructions cause the computing device to install a timer handler during the firmware initialization phase.

4. The at least one computer accessible medium of claim 2, wherein to allocate the primary buffer comprises to allocate the primary buffer for stage of the streamed image data during the firmware initialization phase.

5. The at least one non-transitory computer accessible medium of claim 1, wherein the plurality of instructions cause the computing device to count down a period of time and use a management interrupt to invoke a timer handler if the period of time expires.

6. The at least one non-transitory computer accessible medium of claim 5, wherein the plurality of instructions cause the computing device to check for a reverse gearshift event if the time interval expires.

7. The at least one non-transitory computer accessible medium of claim 6, wherein the plurality of instructions cause the computing device to stream image data from the camera in response to a reverse gearshift event being detected.

8. The at least one non-transitory computer accessible medium of claim 1, wherein the special-purpose operating mode is a system management mode (SMM).

9. The at least one non-transitory computer accessible medium of claim 1, wherein the plurality of instructions cause the computing device to execute a normal operating mode on the computing device, wherein the special-purpose operating mode runs concurrently with the normal operating mode.

10. The at least one non-transitory computer accessible medium of claim 1, wherein the plurality of instructions cause the computing device to display the image data from the camera at a display coupled to the computing device in real time during any phase of operation of the computing device.

11. The at least one non-transitory computer accessible medium of claim 1, wherein the plurality of instructions cause the computing device to allocate a common buffer usable by one or more graphics drivers of the computing device to receive the streamed image data from the camera.

12. The at least one non-transitory computer accessible medium of claim 1, wherein the plurality of instructions cause the computing device to assign a higher priority to the primary buffer than the secondary buffer.

13. The at least one non-transitory computer accessible medium of claim 12, wherein the plurality of instructions cause the computing device to merge the contents of the primary and secondary buffers.

14. A computing device comprising:
at least one processor core; and
a memory device coupled to the at least one processor core, the memory device having stored therein a plurality of instructions that when executed by the at least one processor core, cause the at least one processor core to:

allocate, during a pre-boot phase of the computing device, a primary buffer of a memory of the computing device for storage of streamed image data from a camera of the computing device;

allocate, during the pre-boot phase of the computing device, a secondary buffer of the memory for storage of image data, other than the streamed image data, produced by the computing device during the pre-boot phase;

store, during the pre-boot phase of the computing device, the image data produced by the computing device during the pre-boot phase in the secondary buffer;

initiate, during the pre-boot phase of the computing device, the streaming of image data from the camera to the primary buffer;

issue a management interrupt to report the location of the allocated memory to a timer handler.

15. The computing device of claim 14, comprising an input/output subsystem communicatively coupled to a reverse gearshift detector.

16. The computing device of claim 14, wherein the computing device is coupled to a vehicle navigation system.

17. A method for streaming image data from a camera into a memory, the method comprising:
allocating, during a pre-boot phase of the computing device, a primary buffer of the memory of the computing device for storage of streamed image data from the camera of the computing device;

allocating, during the pre-boot phase of the computing device, a secondary buffer of the memory for storage of image data, other than the streamed image data, produced by the computing device during the pre-boot phase;

store, during the pre-boot phase of the computing device, the image data produced by the computing device during the pre-boot phase in the secondary buffer;

initiating, during the pre-boot phase of the computing device, the streaming of image data from the camera to the primary buffer;

issuing a management interrupt to report the location of the allocated memory to a timer handler.

18. The method of claim 17, further comprising:
determining whether a reverse gearshift event has occurred; and
clearing the primary buffer in response to determining a reverse gearshift event not having occurred.

* * * * *